(12) United States Patent
Chiu

(10) Patent No.: US 11,455,260 B1
(45) Date of Patent: Sep. 27, 2022

(54) SYSTEM AND METHOD FOR SIMULATING PHYSICAL-KEYBOARD SIGNAL

(71) Applicant: GETAC TECHNOLOGY CORPORATION, Hsinchu County (TW)

(72) Inventor: Chia-Chang Chiu, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 0 days.

(21) Appl. No.: 17/402,919

(22) Filed: Aug. 16, 2021

(51) Int. Cl.
G06F 13/10 (2006.01)
(52) U.S. Cl.
CPC ........ G06F 13/105 (2013.01); *G06F 2213/40* (2013.01)
(58) Field of Classification Search
CPC ............................ G06F 13/105; G06F 2213/40
See application file for complete search history.

(56) References Cited

U.S. PATENT DOCUMENTS

2019/0094984 A1\* 3/2019 Lin ..................... G06F 3/0238

FOREIGN PATENT DOCUMENTS

JP 3262989 B2 \* 3/2002 ............. G06F 3/023

\* cited by examiner

*Primary Examiner* — Henry Tsai
*Assistant Examiner* — John B Roche

(57) ABSTRACT

A method for simulating a physical-keyboard signal includes executing a monitoring program in an operating system, receiving at least one input key code signal by the monitoring program, sending the input key code signal to an embedded controller, looking up a key mapping table by the embedded controller according to the input key code signal to obtain a keyboard scan code signal corresponding to the input key code signal, sending the obtained keyboard scan code signal to the operating system, and performing a corresponding function by the operating system according to the keyboard scan code signal.

9 Claims, 5 Drawing Sheets

SYSTEM AND METHOD FOR SIMULATING PHYSICAL-KEYBOARD SIGNAL

BACKGROUND OF THE INVENTION

Field of the Invention

The present invention relates to a digital signal processing system and method, and more particularly, to a system and method for simulating a physical-keyboard signal.

Description of the Prior Art

Accompanied by the popularity of various computer devices, control behaviors of lower layers of corresponding input apparatuses are also affected. A current keyboard adopts a key scan code identification mechanism, in which each key corresponds to one keyboard scan code. In response to requirements of special machines, non-standard keyboards are used, for example, automated teller machines (ATMs) and virtual machines. A non-standard keyboard also uses non-standard keyboard scan codes.

For the various non-standard keyboard scan codes above, means such as drivers or plug-ins may be used to enable an operating system to identify keys and groups of keyboard scan codes corresponding to the keys. However, due to access restrictions of an operating system, keyboard scan codes corresponding to specific keys (or key combinations) may not be obtained through software or drivers, such that corresponding functions of the specific keys cannot be triggered.

SUMMARY OF THE INVENTION

In view of the above, in some embodiments, a system for simulating a physical-keyboard signal includes a signal source terminal, a storage unit, a processor and an embedded controller. The signal source terminal is for sending an input key code signal. The storage unit has a monitoring program and an operating system. The processor executes the monitoring program and the operating system. The embedded controller has a key mapping table, the key mapping table records a plurality of keyboard scan code signals, and each input key code signal corresponds to one of the keyboard scan code signals. When the monitoring program is executed, the processor determines whether the input key code signal sent by the signal source terminal is a virtual key code signal or a keyboard scan code signal, sends the input key code signal determined as the virtual key code signal to the embedded controller so that the embedded controller looks up the corresponding keyboard scan code signal according to the received input key code signal, and sends the obtained keyboard scan code signal to the operating system.

In some embodiments, the signal source terminal is a virtual keyboard program, a special-standard keyboard or a physical keyboard.

In some embodiments, if the input key code signal is the keyboard scan code signal, the processor sends the input key code signal determined as the keyboard scan code signal to the operating system.

In some embodiments, a low-pin-count interface is included. The low-pin-count interface is coupled to the processor and the embedded controller, and is for transmitting the input key code signal.

In some embodiments, the storage unit includes a target program, and the processor executes the target program. When the target program is executed, the processor receives the keyboard scan code signal from the operating system, and performs a preset function according to the keyboard scan code signal.

In some embodiments, a method for simulating a physical-keyboard signal includes executing a monitoring program in an operating system, receiving an input key code signal by the monitoring program, determining whether the input key code signal is a virtual key code signal or a keyboard scan code signal by the monitoring program, sending the input key code signal to an embedded controller if the input key code signal is the virtual key code signal, looking up a key mapping table according to the input key code signal by the embedded controller to obtain a keyboard scan code signal corresponding to the input key code signal, and sending the obtained keyboard scan code signal to the operating system.

In some embodiments, the step of determining whether the input key code signal is the virtual key code signal or the keyboard scan code signal by the monitoring program includes sending the keyboard scan code signal to the operating system by the monitoring program if the input key code signal is the keyboard scan code signal.

In some embodiments, after the step of executing the monitoring program in the operating system, the method further includes executing a target program in the operating system, and sending the keyboard scan code signal to the target program by the operating system to trigger a preset function of the target program.

In conclusion, the system and method for simulating a physical-keyboard signal are capable of identifying, in an operating system or a target program, a key signal (i.e., the input key code signal) sent by a virtual input interface, and executing a preset function corresponding to the key signal. The system for simulating a physical-keyboard signal is applicable in current hardware structures. The monitoring program sends an actual keyboard scan code signal through an embedded controller to the operating system (or the target program), so that the input key code signal sent by the virtual input interface can be regarded by the operating system (or the target program) as a keyboard scan code signal sent by a physical keyboard.

DETAILED DESCRIPTION OF THE EMBODIMENTS

Figure 1A:
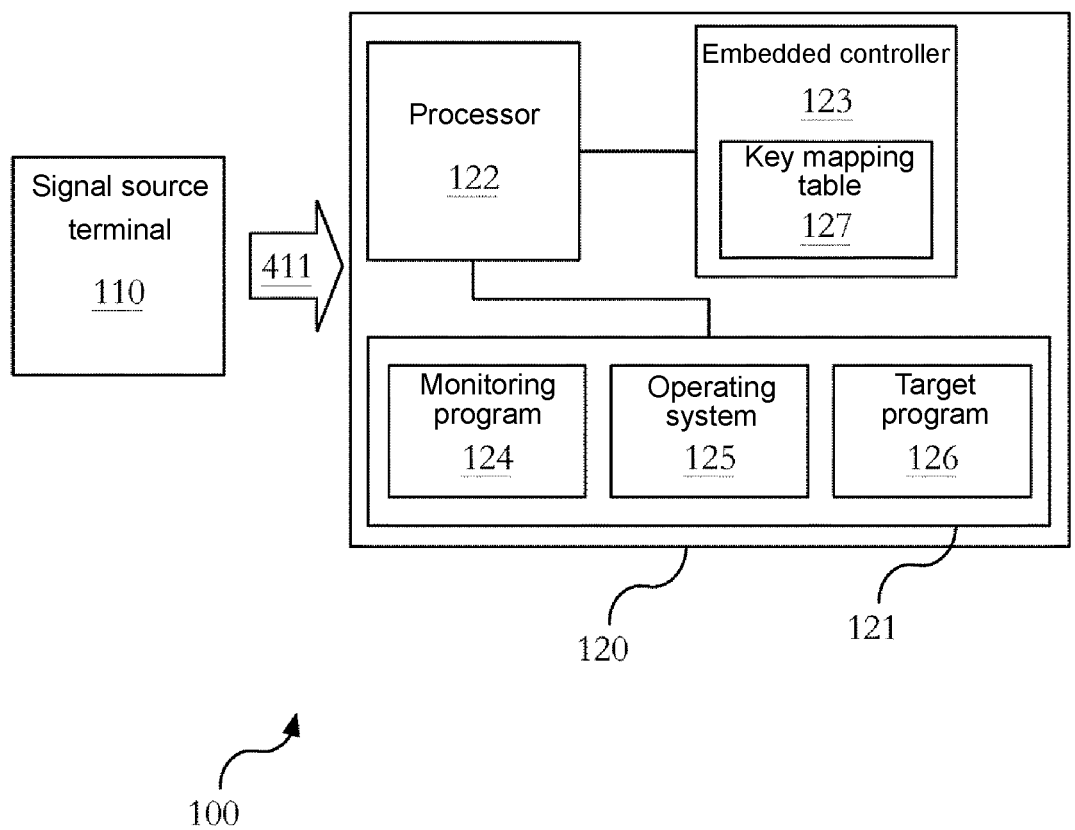
FIG. 1A is a schematic diagram of a system for simulating a physical-keyboard signal according to an embodiment.

Referring to FIG. 1A, a system 100 for simulating a physical-keyboard signal includes a signal source terminal 110 and a computer 120. The computer 120 receives an input key code signal 411 sent by the signal source terminal 110. The computer 120 includes a storage unit 121, a processor 122 and an embedded controller 123. The system 100 for simulating a physical-keyboard signal is applicable to, for example but not limited to, Microsoft Windows operating system 125 series, Apple OS X operating system 125 series, or another Uniplexed Information and Computing Service (UNIX) operating system 125. The processor 122 is coupled to the storage unit 121 and the embedded controller 123. The storage unit 121 has a monitoring program 124, an operating system 125 and a target program 126. The processor 122 executes the monitoring program 124, the operating system 125 and the target program 126.

Figure 1B:
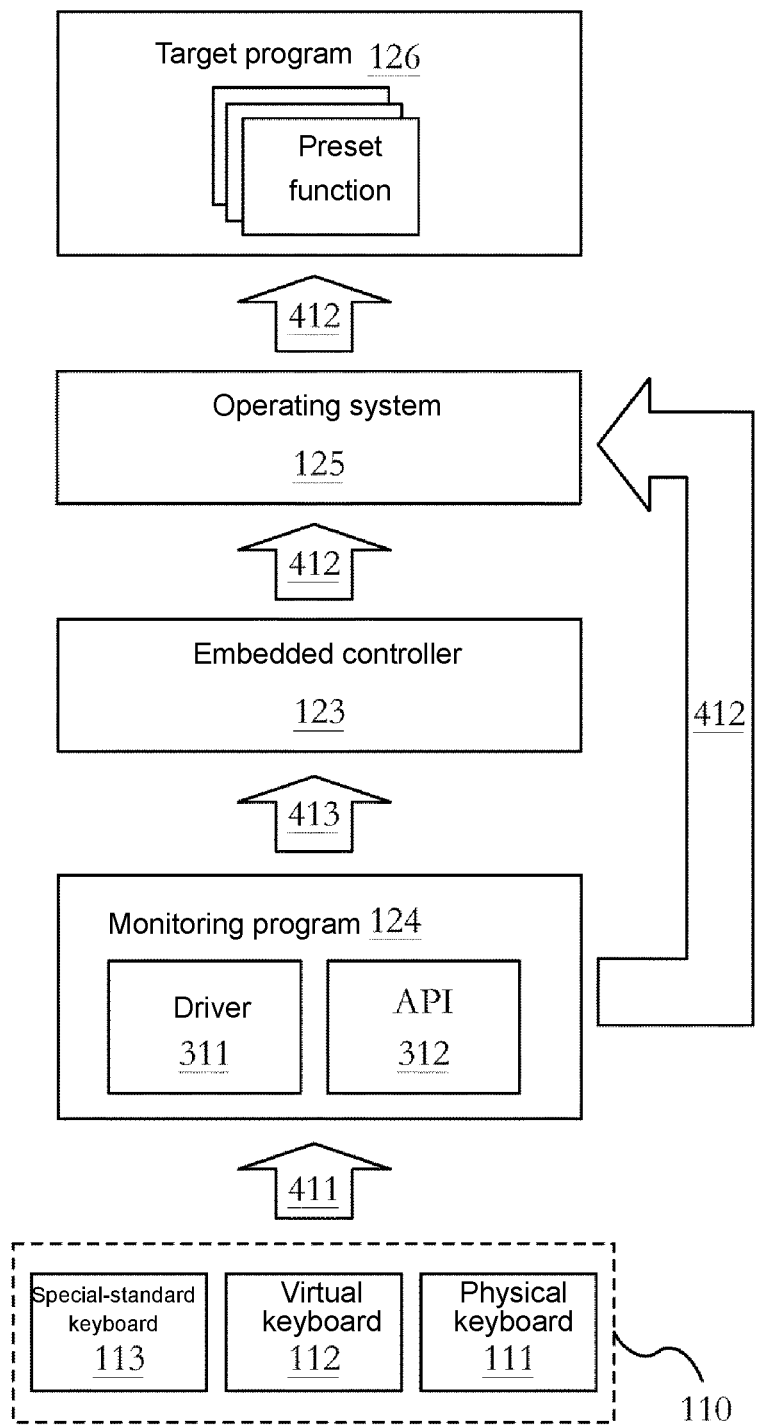
FIG. 1B is a schematic diagram of types of a signal source terminal according to an embodiment.

Referring to FIG. 1B, the signal source terminal 110 generates an input key code signal 411 according to an input request. The input request is an input operation such as clicking performed by a user on keys provided by the signal source terminal 110 during a local operation or a remote connection. In some embodiments, the signal source terminal 110 may be a physical keyboard 111 (e.g., a common QWERTY keyboard or a Dvorak keyboard), a virtual keyboard program (hereinafter referred to as a virtual keyboard 112) or a special-standard physical keyboard 111 (hereinafter referred to as a special-standard keyboard 113 as a differentiation from the physical keyboard 111), as shown in FIG. 1B.

If the signal source terminal 110 is the physical keyboard 111 or the special-standard keyboard 113, the computer 120 can be connected to the physical keyboard 111 or the special-standard keyboard 113 through a connection port such as the Standard PS/2 Keyboard driver (PS/2) or Universal Serial Bus (USB). If the signal source terminal 110 is the virtual keyboard 112, the processor 122 executes the target program 126 and enables the corresponding virtual keyboard 112 for the operating system 125 or the target program 126 to obtain an input key code signal 411.

The input key code signal 411 may be a single key signal, or may be a signal of a key combination. In other words, the signal source terminal 110 has one or more keys (e.g., physical keys and/or virtual keys). The signal source terminal 110 generates the input key code signal 411 corresponding to the triggered key(s) in response to a trigger operation (e.g., click-select) performed by the user on the one or more keys.

The input key code signal 411 may be distinguished as a key scan code signal 412 and a virtual key code signal 413 in accordance with the type of the signal source terminal 110. When the user presses a key of the physical keyboard 111, the physical keyboard 111 sends a keyboard scan code signal 412. The keyboard scan code signal 412 of the physical keyboard 111 is to be responded to by the operating system 125.

The virtual keyboard 112 is a keyboard interface provided by the operating system 125 (or the target program 126). The virtual key code signal 413 is responded to by the operating system 125, so the virtual key code signal 413 is restricted by the operating system 125 or calling of a driver 311. The special-standard keyboard 113 may be applied in an apparatus such as an interactive information kiosk, an automated teller machine (ATM), a point-of-sale (POS) system, or a virtual keyboard 112 of a program on a remote desktop 521 (referring to FIG. 4).

For example, an interactive information kiosk (i.e., the computer 120) is provided in a chain store for a consumer to operate corresponding services. The interactive information kiosk provides the virtual keyboard 112 of a touch screen, or a physical special-standard keyboard 113. Keys of the special-standard keyboard 113 correspond to different function options which may correspond to corresponding hotkeys (or key combinations) of the operating system 125 or the target program 126. For example, the input key code signal 411 of the key "cancel" of the special-standard keyboard 113 may correspond to "Ctrl+F12" (not shown) of the physical keyboard 111.

In different types of operating systems, the monitoring program 124 may be implemented by means of the driver 311 or an application programming interface (API) 312. When the processor 122 executes the monitoring program 124, the processor 122 receives the input key code signal 411 by the monitoring program 124 executed thereby, and determines a destination target for forwarding according to the type of the input key code signal 411 (with details of the operation process described below).

In other words, the processor 122 determines whether the input key code signal 411 is the virtual key code signal 413 or the keyboard scan code signal 412 according to the contents (e.g., the package format or potential level) of the input key code signal 411 or according to the type of the signal source terminal 110, and further determines the destination target for forwarding according to the determination result. Taking the foregoing interactive information kiosk as an example, the processor 122 regards the input key code signal 411 sent by the virtual keyboard (i.e., the signal source terminal 110) in the touch screen through the monitoring program 124 executed thereby as the virtual key code signal 413.

The embedded controller 123 has a key mapping table 127. The key mapping table 127 records a plurality of keyboard scan code signals 412 and the corresponding input key code signals 411. In other words, in the key mapping table 127, each input key code signal 411 is provided with a corresponding keyboard scan code signal 412. The embedded controller 123 looks up the key mapping table 127 according to the input key code signal 411 sent by the monitoring program 124 to obtain the corresponding keyboard scan code signal 412. Moreover, the embedded controller 123 sends the obtained keyboard scan code signal 412 to the operating system 125, so that the operating system 125 performs a corresponding preset function or activating a preset function corresponding to the target program 126. Taking the operating system 125 as an example, the preset function may be copy (corresponding to Ctrl+C), paste (corresponding to Ctrl+V), print (Ctrl+Print) or turn off an application program (corresponding to Alt+F4).

Figure 2:
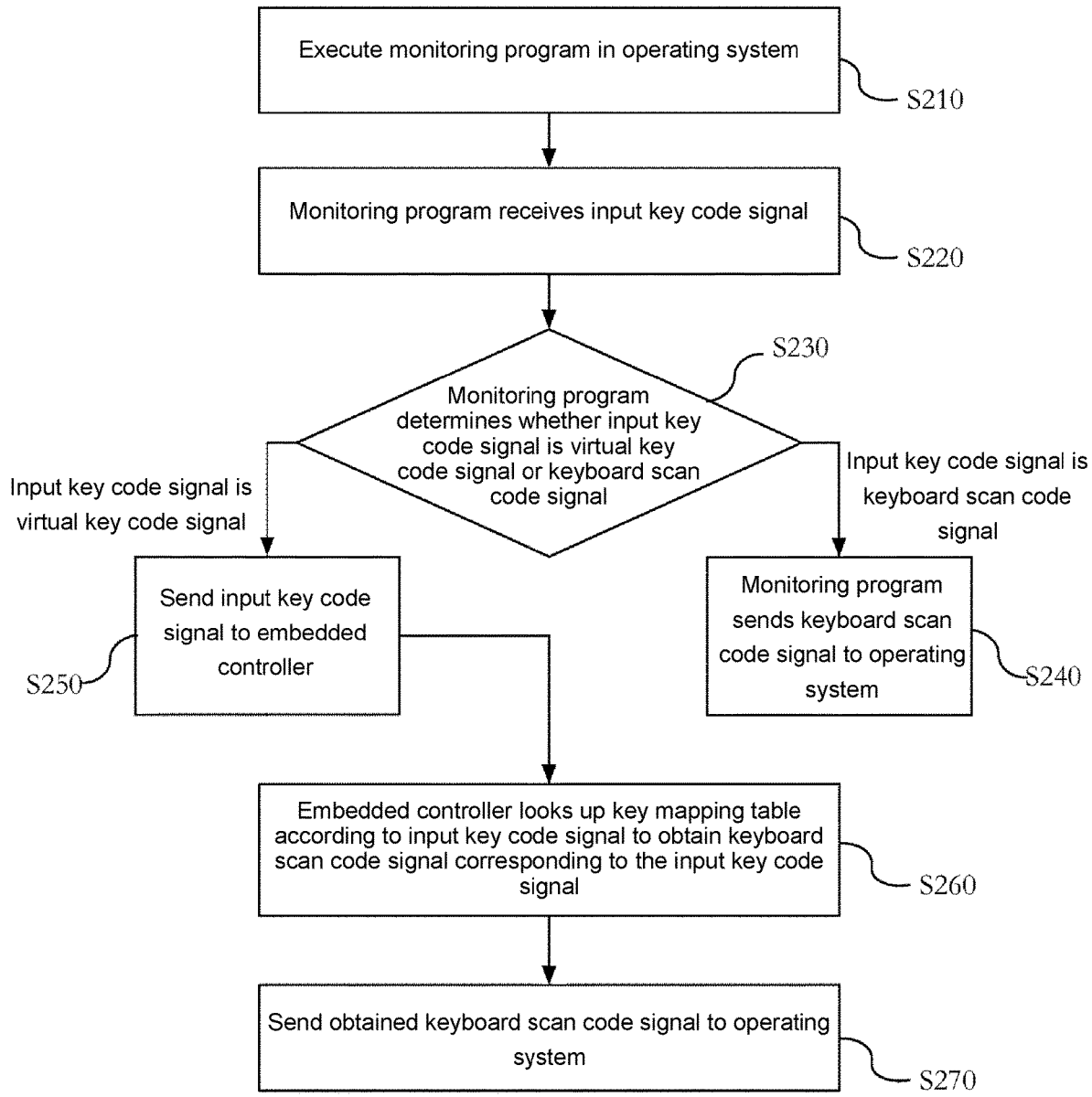
FIG. 2 is a flowchart of a process for simulating a physical-keyboard signal according to an embodiment.

Referring to FIG. 1A and FIG. 2, the processing method for simulating a physical-keyboard signal of this embodiment includes steps of: step S210 of executing the monitoring program 124 in the operating system 125; step S220 of receiving the input key code signal 411 by the monitoring program 124; step S230 of determining whether the input key code signal 411 is the virtual key code signal 413 or the keyboard scan code signal 412 by the monitoring program 124; step S240 of sending the keyboard scan code signal 412 to the operating system 125 by the monitoring program 124 if the input key code signal 411 is the keyboard scan code signal 412; step S250 of sending the input key code signal 411 to the embedded controller 123 if the input key code signal 411 is the virtual key code signal 413; step S260 of looking up the key mapping table 127 according to the input key code signal 411 by the embedded controller 123 to obtain the keyboard scan code signal 412 corresponding to the input key code signal 411; and step S270 of sending the obtained keyboard scan code signal 412 to the operating system 125 by the embedded controller 123.

First of all, the processor 122 activates the operating system 125 and executes the monitoring program 124 (corresponding to step S210). The monitoring program 124 detects whether the input key code signal 411 is sent by the signal source terminal 110. If the signal source terminal 110 receives an input request, the signal source terminal 110 generates the corresponding input key code signal 411 according to the input request. The monitoring program 124 receives the input key code signal 411 from the signal source terminal 110.

In some embodiments, as the operating system 125 varies, the monitoring program 124 may have variations of the following implementation forms. In one example, referring to FIG. 1B, for a UNIX operating system 125, the monitoring program 124 may receive the input key code signal 411 from the signal source terminal 110 through an interface port of the driver 311 or the API 312 (corresponding to step S220), and further determine whether the type of the input key code signal 411 is the virtual key code signal 413 or the keyboard scan code signal 412.

In another example, in Microsoft Windows operating system, the monitoring program 124 may communicate with the embedded controller 123 through the following means, for example, through an interface port of the API 312 or the Windows Management Instrumentation Command-line (WMIC) of the Windows operating system. When the interface port of the API 312 of the monitoring program 124 receives the input key code signal 411 (corresponding to step S220), the monitoring program 124 determines whether the type of the input key code signal 411 is the virtual key code signal 413 or the keyboard scan code signal 412.

If the input key code signal 411 is the virtual key code signal 413, the monitoring program 124 forwards the virtual key code signal 413 to the embedded controller 123 (corresponding to step S230). The embedded controller 123 looks up the key mapping table 127 according to the virtual key code signal 413, and obtains the corresponding key scan code signal 412 (corresponding to step S240). The embedded controller 123 sends the keyboard scan code signal 412 to the operating system 125 (corresponding to step S250), so that the operating system 125 performs the corresponding preset function according to the keyboard scan code signal 412. In some embodiments, when the processor 122 executes the target program 126 in the operating system 125, the operating system 125 forwards the obtained keyboard scan code signal 412 to the target program 126, so that the target program 126 performs the corresponding preset function according to the keyboard scan code signal 412. Taking an ATM as the target program 126 for example, the target program 126 provides a plurality of virtual keys for quick money withdrawal, wherein the virtual keys correspond to different preset functions and key combinations.

Figure 3:
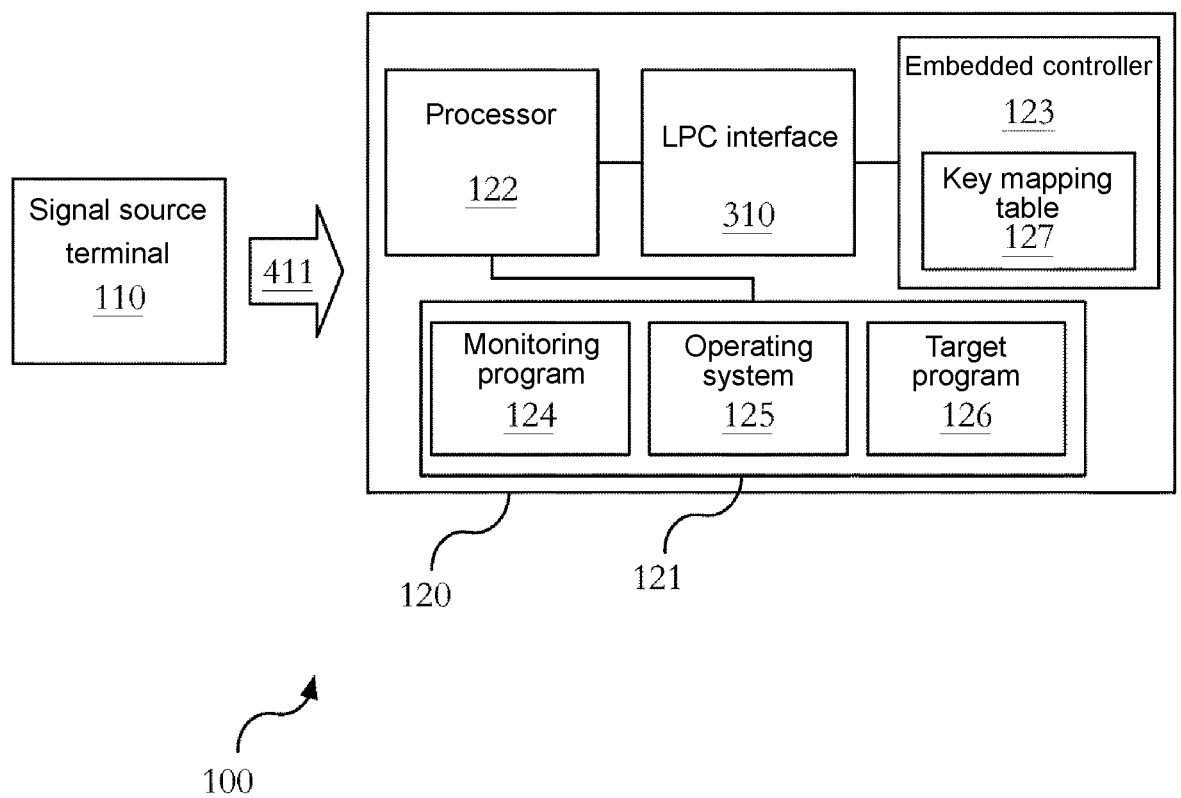
FIG. 3 is a schematic diagram of a system for simulating a physical-keyboard signal according to an embodiment.

In some embodiments, the system 100 for simulating a physical-keyboard signal includes a low pin count (LPC) interface 310, as shown in FIG. 3. The LPC interface 310 is coupled between the processor 122 and the embedded controller 123. The LPC interface 310 is for transmitting the input key code signal 411 between the processor 122 and the embedded controller 123. The monitoring program 124 transmits the input key code signal 411 as the virtual key code signal 413 to the embedded controller 123 through a communication port number provided by the LPC interface 310. The communication port number of the LPC interface 310 may be, for example but not limited to, "60/64", "62/66", or "68/6C". The embedded controller 123 looks up the corresponding keyboard scan code signal 412 according to the virtual key code signal 413.

The embedded controller 123 sends the keyboard scan code signal 412 to the processor 122 through the LPC interface 310. The processor 122 sends the keyboard scan code signal 412 to the operating system 125. The operating system 125 forwards the keyboard scan code signal 412 to the destination target, wherein the destination target may be the operating system 125 itself or the target program 126 executed in the operating system 125. Regardless of the type of the signal source terminal 110, the signal finally received by the operating system 125 is the keyboard scan code signal 412. Thus, even when the input key code signal 411 is the virtual key code signal 413, the operating system 125 is still capable of determining that the virtual key code signal 413 is sent by the physical keyboard 111 and accordingly performing a corresponding function.

Figure 4:
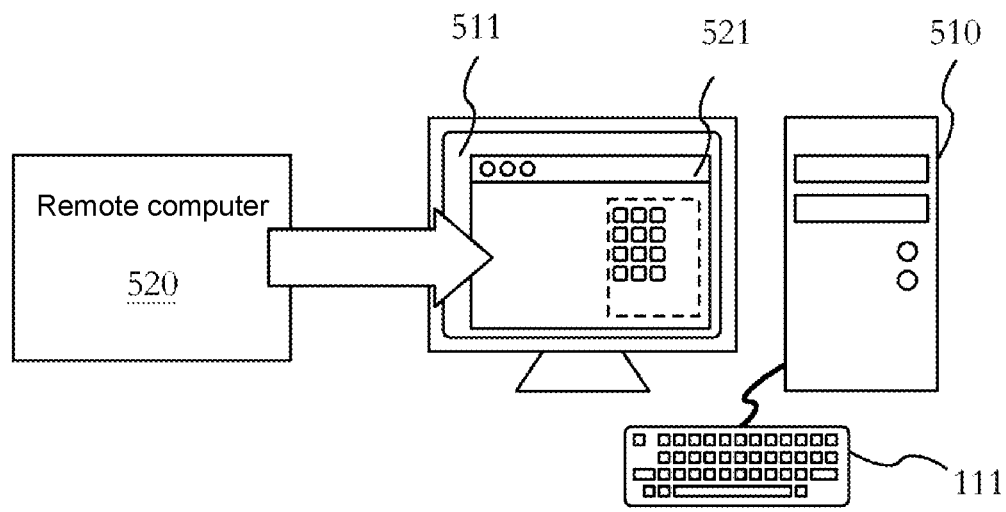
FIG. 4 is a schematic diagram of the connection between a local computer and a remote computer according to an embodiment.
Figure 5:
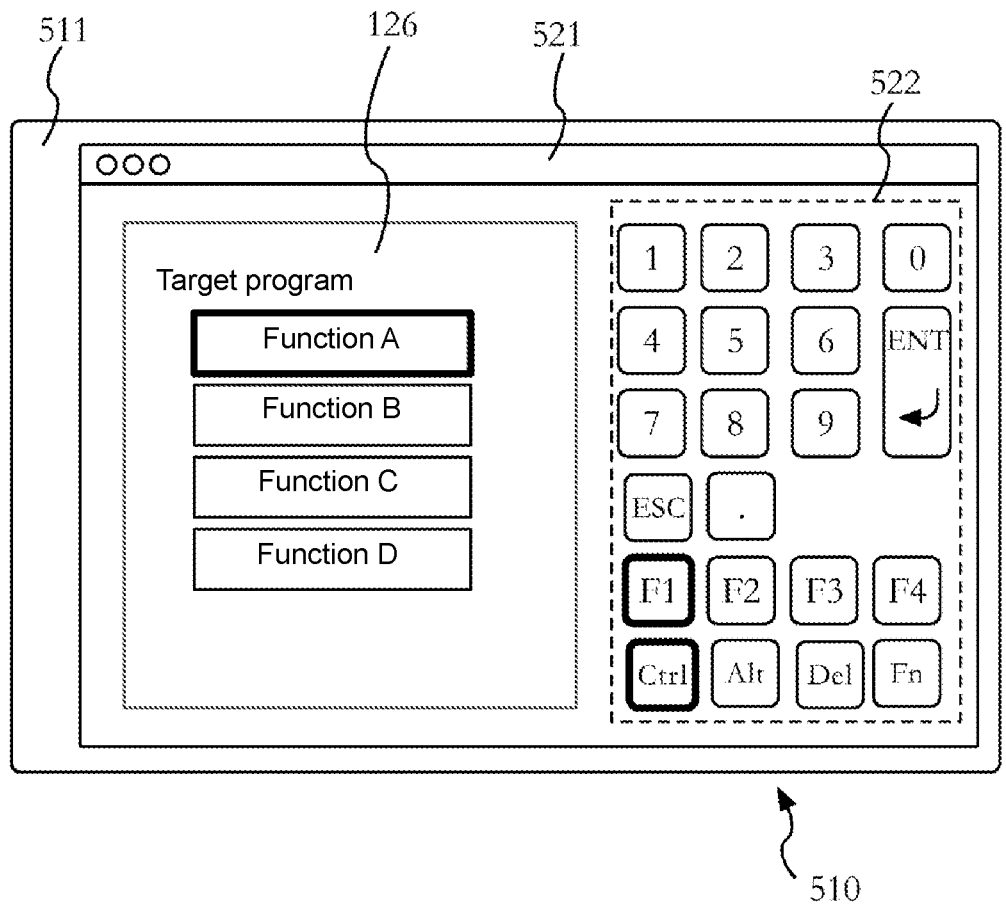
FIG. 5 is a schematic diagram of a remote control desktop according to an embodiment.

Take operating an application program of a remote desktop 521 as an example. A local computer 510 is connected to a remote computer 520 by a network, so that a local desktop 511 of the local computer 510 can display a desktop image of the remote computer 520, as shown in FIG. 4 and FIG. 5. The window displayed by the local computer 510 is the desktop of the remote computer 520, which is hereinafter referred to as the remote desktop 521. Thus, the remote desktop 521 and the target program 126 are displayed in the screen image of the local computer 510. The remote computer 520 applies the system 100 for simulating a physical-keyboard signal according to an embodiment.

Referring to FIG. 5, the remote computer 520 provides a virtual key area 522 and the target program 126 for the remote desktop 521 to a display a user interface of the virtual key area 522 and the target program 126. There are a plurality of numeral keys and function keys in the virtual key area 522. When the user tap-selects the key in the virtual key area 522 using a cursor, the remote computer 520 generates the corresponding input key code signal 411 according to the input request. Alternatively, the keys of the physical keyboard 111 of the local computer 510 can map to the keys of the virtual key area 522. For the remote computer 520, the signal source terminal 110 is the virtual keyboard 112 (i.e., the virtual key area 522). Thus, regardless of whether the user tap-selects the keys of the virtual key area 522 or presses the keys of the physical keyboard 111, the remote computer 520 considers the input key code signal 411 as a virtual key code (i.e., determined as the virtual key code signal 413).

Assume that function keys "Ctrl+F1" and "Ctrl+F2" respectively enable function A and function B of the target program 126. When the user tap-selects "Ctrl" and "F1" in the virtual key area 522, the monitoring program 124 of the remote computer 520 receives the input key code signal 411. In FIG. 5, the tap-selected keys and the function option corresponding to the keys are represented by frames in thickened lines.

When the user tap-selects any key in the virtual key area 522, the monitoring program 124 regards the input key code signal 411 as the virtual key code signal 413. The monitoring program 124 forwards the virtual key code signal 413 to the embedded controller 123. The embedded controller 123 outputs the corresponding keyboard scan code signal 412 to the operating system 125, so that the operating system 125 of the remote computer 520 considers that the input key code signal 411 is sent by the physical keyboard 111 of the local computer 510. The operating system 125 sends the keyboard scan code signal 412 of "Ctrl+F1" to the target program 126, thereby triggering and performing function A.

In conclusion, the system 100 and method for simulating a physical-keyboard signal are capable of identifying, in the operating system 125 or the target program 126, a key signal (i.e., the input key code signal 411) sent by the virtual keyboard 112 or the special-standard keyboard 113, and performing a preset function corresponding to the key signal. The system 100 for simulating a physical-keyboard signal is applicable in current hardware structures. The monitoring program 124 sends the actual keyboard scan code signal 412 to the operating system 125 (or the target program 126) through the embedded controller 123, so that the input key code signal 411 sent by the virtual keyboard 112 or the special-standard keyboard 113 is regarded by the operating system 125 (or the target program 126) as the keyboard scan code signal 412 sent by the physical keyboard 111. Thus, the corresponding function of the operating system 125 (or the target program 126) can be triggered through the virtual key code signal 413.

What is claimed is:

1. A system for simulating a physical-keyboard signal, comprising:
    a signal source terminal, for sending an input key code signal;
    a storage unit, having a monitoring program and an operating system;
    a processor, executing the monitoring program and the operating system; and
    an embedded controller, having a key mapping table, the key mapping stable recording a plurality of keyboard scan code signals, each input key code signal corresponding to one of the keyboard scan code signals;
    wherein, when the monitoring program is executed, the processor determines whether the input key code signal sent by the signal source terminal is a virtual key code signal or the keyboard scan code signal, and sends the input key code signal determined as the virtual key code signal to the embedded controller, so that the embedded controller looks up the corresponding keyboard scan code signal according to the received input key code signal, and sends the obtained keyboard scan code signal to the operating system.

2. The system for simulating a physical-keyboard signal according to claim 1, wherein the signal source terminal is a virtual keyboard program, a special-standard keyboard or a physical keyboard.

3. The system for simulating a physical-keyboard signal according to claim 1, wherein the monitoring program comprises a Windows Management Instrumentation Command-line (WMIC).

4. The system for simulating a physical-keyboard signal according to claim 1, wherein if the input key code signal is the keyboard scan code signal, the processor sends the input key code signal determined as the keyboard scan code signal to the operating system.

5. The system for simulating a physical-keyboard signal according to claim 1, further comprising:
    a low pin count (LPC) interface, coupled to the processor and the embedded controller, and being for transmitting the input key code signal.

6. The system for simulating a physical-keyboard signal according to claim 1, wherein the storage unit comprises a target program, the processor executes the target program, and when the target program is executed, the processor receives the keyboard scan code signal from the operating system, and performs a preset function according to the keyboard scan code signal.

7. A method for simulating a physical-keyboard signal, comprising:
    executing a monitoring program in an operating system;
    receiving an input key code signal by the monitoring system;
    determining whether the input key code signal is a virtual key code signal or a keyboard scan code signal by the monitoring program;
    if the input key code signal is the virtual key code signal, sending the input key code signal to an embedded controller;
    looking up a key mapping table according to the input key code signal by the embedded controller to obtain a keyboard scan code signal corresponding to the input key code signal; and
    sending the obtained keyboard scan code signal to the operating system.

8. The method for simulating a physical-keyboard signal according to claim 7, wherein the step of determining whether the input key code signal is the virtual key code signal or the keyboard scan code signal by the monitoring program comprising:
    if the input key code signal is the keyboard scan code signal, sending the keyboard scan code signal to the operating system by the monitoring program.

9. The method for simulating a physical-keyboard signal according to claim 7, after the step of executing the monitoring program in the operating system, the method further comprising:
    executing a target program in the operating system; and
    sending the keyboard scan code signal to the target program by the operating system to trigger a preset function of the target program.

* * * * *